(12) United States Patent
Miller et al.

(10) Patent No.: US 9,102,348 B2
(45) Date of Patent: Aug. 11, 2015

(54) BABY CARRIAGE CAPABLE OF ADJUSTING RECLINE ANGLE OF SEAT BACK

(71) Applicants: Ryan N. Miller, Lancaster, PA (US); Nathanael Saint, Morgantown, PA (US)

(72) Inventors: Ryan N. Miller, Lancaster, PA (US); Nathanael Saint, Morgantown, PA (US)

(73) Assignee: Wonderland Nurserygoods Company Limited, Kwai Chung, N.T., Hong Kong ( * ) Notice: Subject to any disclaimer, the term of this patent is extended or adjusted under 35 U.S.C. 154(b) by 234 days.

(21) Appl. No.: 13/670,467

(22) Filed: Nov. 7, 2012

(65) Prior Publication Data

US 2013/0119736 A1    May 16, 2013

Related U.S. Application Data

(60) Provisional application No. 61/629,295, filed on Nov. 16, 2011.

(51) Int. Cl.
*B62B 9/10* (2006.01)
*A47D 1/00* (2006.01)
*A47D 13/10* (2006.01)

(52) U.S. Cl.
CPC .............. *B62B 9/104* (2013.01); *A47D 1/002* (2013.01); *A47D 13/107* (2013.01)

(58) Field of Classification Search
CPC ......... A47D 9/00; A47D 1/002; B62D 9/104; A47C 1/0248; A47C 1/03227
USPC ........... 297/256.13, 382, 354.12, 354.13, 380
See application file for complete search history.

(56) References Cited

U.S. PATENT DOCUMENTS

| | | | | |
|---|---|---|---|---|
| 2,947,350 | A | * | 8/1960 | Davis ...................... 297/354.12 |
| 3,404,917 | A | | 10/1968 | Smith |
| 4,007,947 | A | | 2/1977 | Perego |
| 4,577,355 | A | * | 3/1986 | Kassai .............................. 5/93.1 |
| 5,383,708 | A | * | 1/1995 | Nagasaka et al. ........... 297/250.1 |
| 5,393,122 | A | * | 2/1995 | Andrisin, III ............ 297/354.13 |
| 5,882,079 | A | * | 3/1999 | Yang ............................ 297/377 |
| 5,890,762 | A | * | 4/1999 | Yoshida ................... 297/256.13 |
| 6,695,410 | B2 | * | 2/2004 | Hsia ............................ 297/452.4 |
| 6,808,232 | B2 | * | 10/2004 | Takizawa ................. 297/256.13 |
| 6,871,908 | B2 | * | 3/2005 | Takizawa ................. 297/216.11 |
| 7,086,695 | B2 | * | 8/2006 | Hosoya .................... 297/256.16 |

(Continued)

FOREIGN PATENT DOCUMENTS

| | | |
|---|---|---|
| CN | 1408302 A | 4/2003 |
| CN | 2673758 Y | 1/2005 |

(Continued)

*Primary Examiner* — Elizabeth A Plummer
(74) *Attorney, Agent, or Firm* — Winston Hsu; Scott Margo

(57) ABSTRACT

A baby carriage includes a frame, a lock mechanism, a seat back and a webbing. The frame has a first end and a second end opposite to the first end. The lock mechanism has a housing and a lock member, the housing is disposed on the first end, a through hole is formed on the housing, and the lock member is disposed in the through hole. The webbing passes through the through hole, it is wound around a back side of the seat back and attached on the second end. The webbing is clamped in the lock member, so as to keep the seat back at a recline angle. When the lock member is operated to release the webbing, the webbing is capable of moving within the through hole, so as to adjust the recline angle of the seat back.

6 Claims, 3 Drawing Sheets

(56) References Cited

U.S. PATENT DOCUMENTS

| | | | |
|---|---|---|---|
| 7,090,294 B2 * | 8/2006 | Balensiefer et al. | 297/256.14 |
| 2002/0158434 A1 | 10/2002 | Hsia | |
| 2002/0175551 A1 | 11/2002 | Hsia | |
| 2006/0214490 A1 | 9/2006 | Huang | |
| 2007/0102980 A1 * | 5/2007 | Chen | 297/354.12 |
| 2011/0049955 A1 * | 3/2011 | Cheng | 297/354.12 |
| 2014/0008946 A1 * | 1/2014 | Smith | 297/183.1 |

FOREIGN PATENT DOCUMENTS

| | | | | |
|---|---|---|---|---|
| CN | 201822385 U | | 5/2011 | |
| DE | 9102763 U1 * | | 5/1991 | |
| DE | 202 15 784 U1 | | 3/2003 | |
| DE | 102007027655 A1 * | | 12/2008 | B60N 2/20 |
| EP | 2 127 563 A1 | | 12/2009 | |
| EP | 2 199 181 A1 | | 6/2010 | |
| JP | 2007055462 A * | | 3/2007 | |

* cited by examiner

BABY CARRIAGE CAPABLE OF ADJUSTING RECLINE ANGLE OF SEAT BACK

CROSS REFERENCE TO RELATED APPLICATIONS

This application claims the benefit of U.S. Provisional Application No. 61/629,295, which was filed on Nov. 16, 2011, and is incorporated herein by reference.

BACKGROUND OF THE INVENTION

1. Field of the Invention

The invention relates to a baby carriage and, more particularly, to a baby carriage capable of adjusting a recline angle of a seat back.

2. Description of the Prior Art

In the baby carriage market, there are three common seat types. The first seat type consists of a rigid plastic seat shell, located under the seat pad, where the plastic shell provides the structural rigidity. The second seat type consists of a tubular frame and a stretched seat pad, commonly referred to as a slung seat. Slung seats gain their structure by stretching the seat pad over and securely being fastened to a rigid tubular frame. The last seat style is a combination of the first two. These seats have a rigid plastic seat bottom and a fabric slung back support. No matter what the seat type is, a caregiver always needs to adjust a recline angle of the seat back of the baby carriage while a baby seated therein is sleeping or dining. Therefore, it is necessary to develop a mechanism for the baby carriage to adjust the recline angle of the seat back.

SUMMARY OF THE INVENTION

An objective of the invention is to provide a baby carriage capable of adjusting a recline angle of a seat back.

According to one embodiment of the invention, a baby carriage comprises a frame, a lock mechanism, a seat back and a webbing. The frame has a first end and a second end opposite to the first end. The lock mechanism has a housing and a lock member, the housing is disposed on the first end, a through hole is formed on the housing, and the lock member is disposed in the through hole. The webbing passes through the through hole, it is wound around a back side of the seat back and attached on the second end. The webbing is clamped in the lock member, so as to keep the seat back at a recline angle. When the lock member is operated to release the webbing, the webbing is capable of moving within the through hole, so as to adjust the recline angle of the seat back.

In this embodiment, when the webbing is released and pulled toward a direction away from the housing, the recline angle of the seat back decreases. On the other hand, when the webbing is released and loosened, the recline angle of the seat back increases.

As mentioned above, the invention uses the webbing to adjust the recline angle of the seat back and uses the lock mechanism to lock or release the webbing. When a caregiver wants to adjust the recline angle of the seat back, he or she only has to operate the lock member to release the webbing and then pull or loosen the webbing. Accordingly, the mechanism of the invention for adjusting the recline angle of the seat back is simple and easy to be achieved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
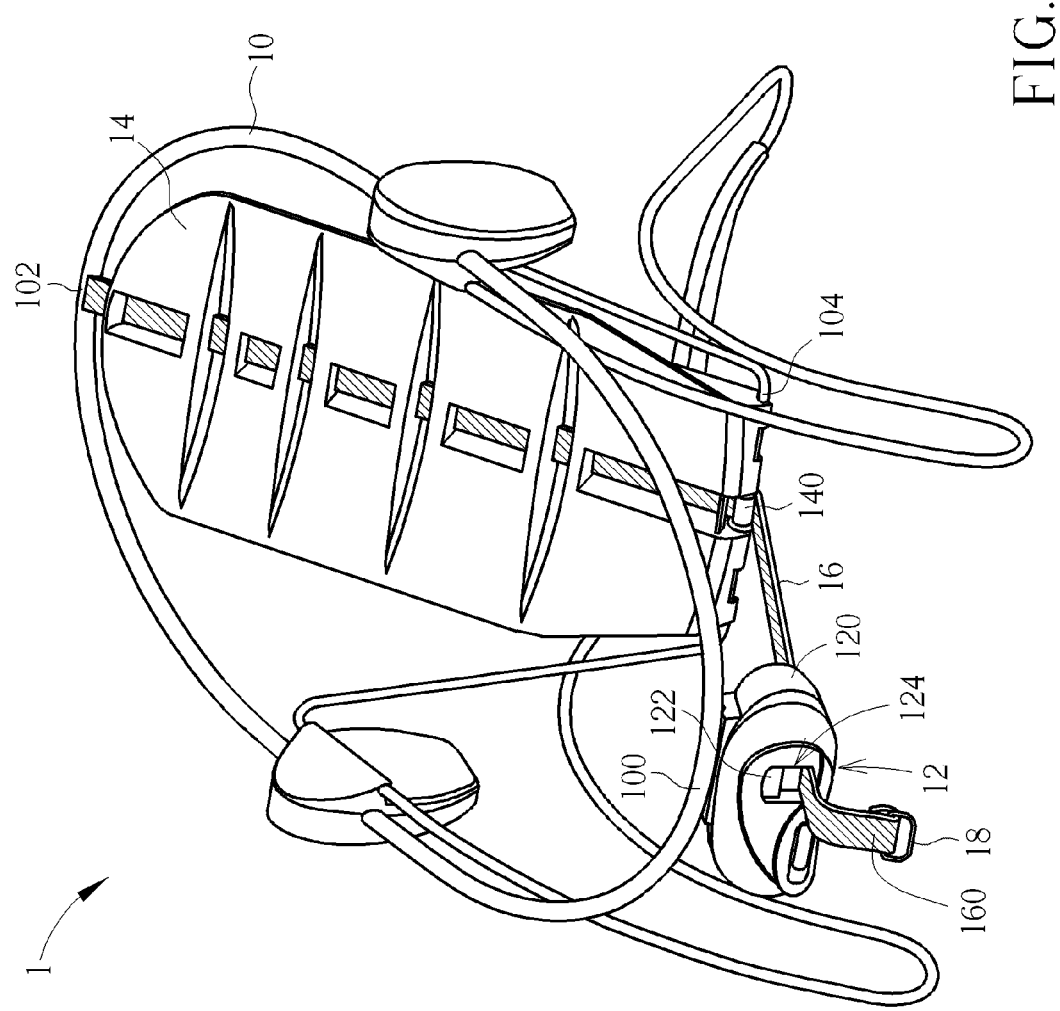
FIG. 1 is a perspective view illustrating a baby carriage according to an embodiment of the invention.
Figure 2:
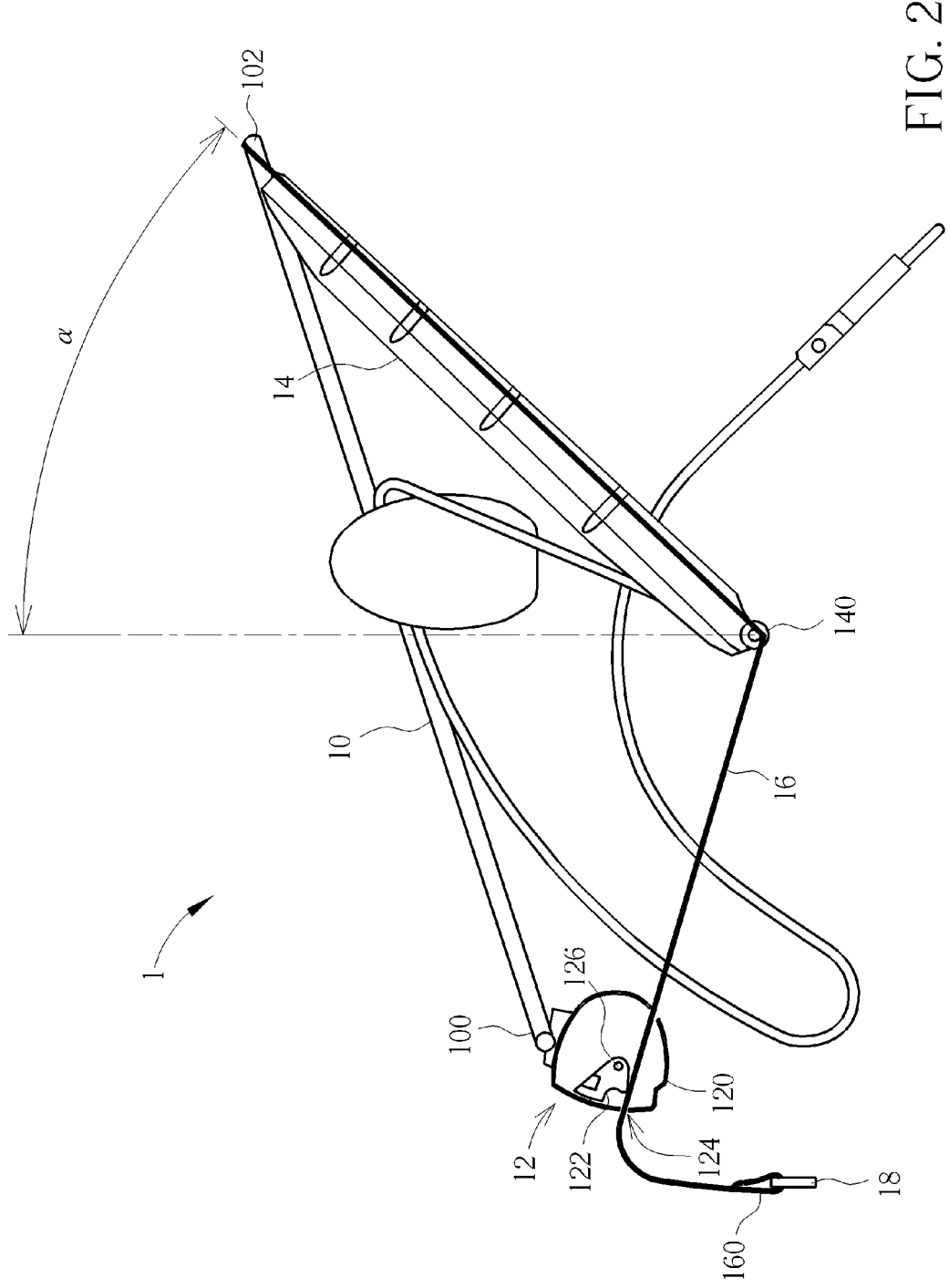
FIG. 2 is a side view illustrating the baby carriage shown in FIG. 1.
Figure 3:
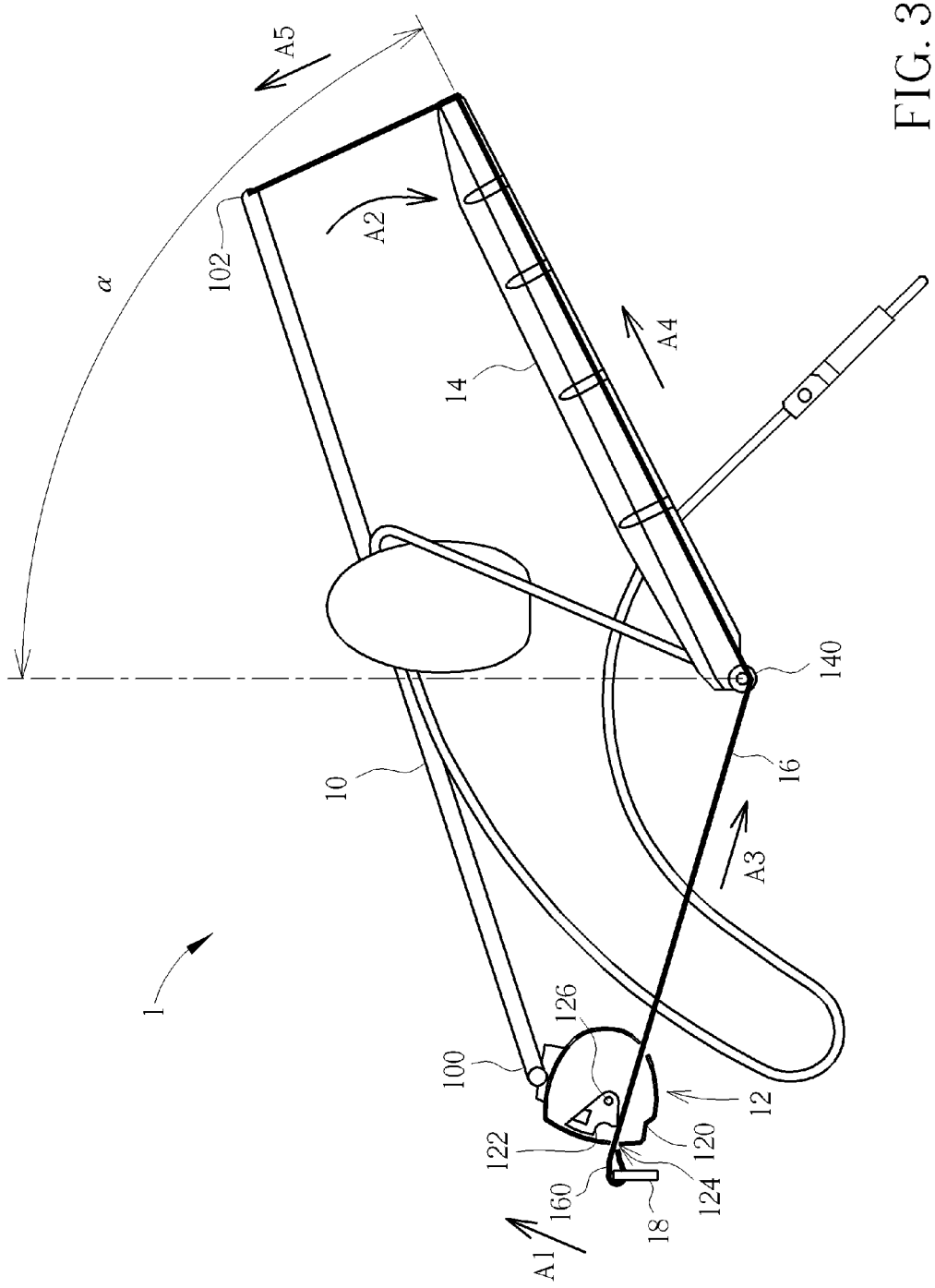
FIG. 3 is a side view illustrating the recline angle of the seat back being adjusted by operating the lock member shown in FIG. 2.

Referring to FIGS. 1 to 3, FIG. 1 is a perspective view illustrating a baby carriage 1 according to an embodiment of the invention, FIG. 2 is a side view illustrating the baby carriage 1 shown in FIG. 1, and FIG. 3 is a side view illustrating the recline angle $\alpha$ of the seat back 14 being adjusted by operating the lock member 122 shown in FIG. 2.

As shown in FIGS. 1 to 3, the baby carriage 1 comprises a frame 10, a lock mechanism 12, a seat back 14 and a webbing 16. In this embodiment, the baby carriage 1 may be a baby swing, a bouncer, a stroller, a high chair, and so on. The frame 10 has a first end 100, a second end 102 opposite to the first end 100, and a traverse shaft 104. In this embodiment, when the frame 10 is placed on the ground, the first end 100 is lower than the second end 102. The lock mechanism 12 has a housing 120 and a lock member 122, the housing 120 is disposed on the first end 100 of the frame 10, a through hole 124 is formed on the housing 120, and the lock member 122 is disposed in the through hole 124. In this embodiment, the lock member 122 is pivotally disposed in the through hole 124 such that the lock member 122 is capable of being pressed to rotate so as to release the webbing 16. As shown in FIGS. 2 and 3, the lock member 122 is pivotally connected to an axle 126.

The webbing 16 passes through the through hole 124, it is wound around a back side of the seat back 14 and attached on the second end 102 of the frame 10. In this embodiment, the webbing 16 can be clamped in the lock member 122, so as to keep the seat back 14 at a recline angle $\alpha$, as shown in FIG. 2. However, in another embodiment, the webbing 16 can be clamped between the lock member 122 and an inner wall of the through hole 124 based on practical applications, so as to keep the seat back 14 at the recline angle $\alpha$. In this embodiment, the seat back 14 has a roller 140. One end of the seat back 14 is pivotally connected to the traverse shaft 104 of the frame 10 and the webbing 16 is wound around the roller 140, such that the seat back 14 is capable of rotating about the webbing 16 by the roller 140.

When the lock member 122 is operated to release the webbing 16, the webbing 16 is capable of moving within the through hole 124 so as to adjust the recline angle $\alpha$ of the seat back 14. As shown in FIG. 3, when a caregiver wants to adjust the recline angle $\alpha$ of the seat back 14, he or she has to press the lock member 122 in a direction indicated by an arrow A1 and then the lock member 122 rotates, so as to release the webbing 16. However, in another embodiment, the caregiver may press the lock member 122 in a reversed direction of the arrow A1 according to the configuration of the lock member 122 to release the webbing 16. When the webbing 16 is released, the caregiver can pull or loosen the webbing 16 so as to adjust the recline angle $\alpha$ of the seat back 14. For example, when the webbing 16 is released and pulled toward a direction away from the housing 120, the recline angle $\alpha$ of the seat back 14 decreases, so that the seat back 14 can be moved to a more upright position, as shown in FIG. 2. On the other hand, when the webbing 16 is released and loosened, the seat back 14 rotates about the roller 140 in a direction indicated by an arrow A2, the webbing 16 is lengthened in directions indicated by arrows A3 to A5, and the recline angle α of the seat back 14 increases, so that the seat back 14 can be moved to a more recumbent position, as shown in FIG. 3. After adjusting the seat back 14 to a desired recline angle α, the caregiver can remove his or her finger from the lock member 122 and then the lock member 122 rotates to clamp the webbing 16 again, so as to keep the seat back 14 at the desired recline angle α.

In this embodiment, the baby carriage 1 may further comprise a ring member 18 disposed on a free end 160 of the webbing 16, wherein the free end 160 is close to the first end 100 of the frame 10 and exposed out of the through hole 124 of the lock mechanism 12. When the webbing 16 is released, the caregiver can hold the ring member 18 to pull the webbing 16 toward the direction away from the housing 120 or hold the ring member 18 to loosen the webbing 16. Furthermore, the ring member 18 can prevent the webbing 16 from coming off the lock mechanism 12.

As mentioned above, the invention uses the webbing to adjust the recline angle of the seat back and uses the lock mechanism to lock or release the webbing. When a caregiver wants to adjust the recline angle of the seat back, he or she only has to operate the lock member to release the webbing and then pull or loosen the webbing. Accordingly, the mechanism of the invention for adjusting the recline angle of the seat back is simple and easy to be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A baby carriage comprising:
   a frame having a first end and a second end opposite to the first end;
   a lock mechanism having a housing and a lock member, the housing being disposed on the first end, a through hole being formed on the housing, the lock member being disposed in the through hole;
   a seat back having a roller; and
   a webbing passing through the through hole, wound around the roller and a back side of the seat back and attached on the second end, the webbing being clamped in the lock member, so as to keep the seat back at a recline angle;
   wherein when the lock member is operated to release the webbing, the webbing is capable of moving within the through hole and the seat back is capable of rotating about the webbing by the roller, so as to adjust the recline angle of the seat back.

2. The baby carriage of claim 1, wherein the lock member is pivotally disposed in the through hole, such that the lock member is capable of being pressed to rotate, so as to release the webbing.

3. The baby carriage of claim 1, wherein when the frame is placed on ground, the first end is lower than the second end.

4. The baby carriage of claim 1, wherein when the webbing is released and pulled toward a direction away from the housing, the recline angle of the seat back decreases; and when the webbing is released and loosened, the recline angle of the seat back increases.

5. The baby carriage of claim 1, wherein the frame has a traverse shaft and one end of the seat back is pivotally connected to the traverse shaft.

6. The baby carriage of claim 1, further comprising a ring member disposed on a free end of the webbing, wherein the free end is close to the first end and exposed out of the through hole.

\* \* \* \* \*